(12) United States Patent
Bell et al.

(10) Patent No.: US 6,638,553 B2
(45) Date of Patent: Oct. 28, 2003

(54) SYSTEM AND METHOD FOR MONOLAYER ALIGNMENT SNACK CHIP TRANSFER

(75) Inventors: Brian Keith Bell, Lewisville, TX (US); Steven Theodore Chandler, Plano, TX (US); Eric P. Farabaugh, Plano, TX (US); Joseph H. Gold, Dallas, TX (US); Terry Dale Klockenga, Plano, TX (US); John Curtis McConn, Bakersfield, CA (US); Daniel Eugene Orr, Dallas, TX (US); Edward Leon Ouellette, Corinth, TX (US); Scott L. Robinson, Chicago, IL (US); Heinz Roel, Prosper, TX (US); Richard James Ruegg, Coppell, TX (US)

(73) Assignee: RECOT, Inc., Pleasanton, CA (US)

( * ) Notice: Subject to any disclaimer, the term of this patent is extended or adjusted under 35 U.S.C. 154(b) by 46 days.

(21) Appl. No.: 09/973,144

(22) Filed: Oct. 9, 2001

(65) Prior Publication Data

US 2003/0068418 A1 Apr. 10, 2003

(51) Int. Cl.$^7$ .............................. A21C 9/00; A21D 8/00
(52) U.S. Cl. ........................ 426/496; 99/352; 99/386; 99/443 C; 198/602; 426/523
(58) Field of Search ................. 426/496, 503, 426/523; 99/352, 355, 386, 443 C; 198/602

(56) References Cited

U.S. PATENT DOCUMENTS

| | | |
|---|---|---|
| 3,812,647 A | 5/1974 | Bertling et al. |
| 3,888,363 A | 6/1975 | Erekson |
| 3,975,795 A | 8/1976 | Kupcikevicius |
| 4,054,015 A | 10/1977 | Rowell |
| 4,098,909 A | 7/1978 | Mims |
| 4,134,333 A | 1/1979 | Warren |
| 4,187,581 A | 2/1980 | Wagner |
| 4,194,443 A | 3/1980 | Mims |
| 4,246,290 A | 1/1981 | Haas, Sr. et al. |
| 4,614,141 A | 9/1986 | Mendenhall et al. |
| 4,622,891 A | 11/1986 | Cramer et al. |
| 4,648,237 A | 3/1987 | Total |
| H318 H | 8/1987 | Mims |
| 4,741,916 A * | 5/1988 | Heidel et al. ............... 426/503 |
| 4,842,181 A | 6/1989 | Walser |
| 4,984,734 A | 1/1991 | Zion et al. |
| 5,006,358 A * | 4/1991 | Rubio et al. ............... 426/496 |
| 5,078,255 A | 1/1992 | Haley |
| 5,279,096 A | 1/1994 | Mims |
| 5,279,526 A | 1/1994 | Gundlach |
| 5,303,811 A | 4/1994 | Haley |
| 5,314,056 A | 5/1994 | Davis et al. |
| 5,381,883 A | 1/1995 | Mims |
| 5,409,721 A * | 4/1995 | Rademaker ............... 426/503 |
| 5,419,677 A | 5/1995 | Cohn |
| 5,507,073 A | 4/1996 | Aldridge |
| 5,630,496 A | 5/1997 | Mims |
| 5,634,549 A | 6/1997 | Mims |
| 5,641,265 A | 6/1997 | Spada et al. |
| 5,673,783 A | 10/1997 | Radant et al. |
| 5,720,593 A | 2/1998 | Pleake |
| 5,761,883 A | 6/1998 | Pruett et al. |
| 5,782,332 A | 7/1998 | Guidetti et al. |
| 5,787,687 A | 8/1998 | Mueller et al. |
| 5,794,756 A | 8/1998 | Taylor et al. |
| 5,829,954 A | 11/1998 | Pruett |
| 5,865,106 A | 2/1999 | van der Ent |
| 5,915,521 A | 6/1999 | Raque |
| 6,129,939 A | 10/2000 | Fink et al. |

* cited by examiner

Primary Examiner—George C. Yeung
(74) Attorney, Agent, or Firm—Colin P. Cahoon; Carstens, Yee & Cahoon, L.L.P.

(57) ABSTRACT

The system and method for monolayer alignment snack chip transfer process a snack chip from a first to a second conveyor. By using a roll at the discharge of the toast oven conveyor that has a diameter that is substantially closer in size to the pickup roll of the second conveyor, mechanical devices for lifting the chips off of the toast oven conveyor can be avoided. Further, chip preforms' alignment in passing between the two conveyors is maintained.

14 Claims, 7 Drawing Sheets

SYSTEM AND METHOD FOR MONOLAYER ALIGNMENT SNACK CHIP TRANSFER

BACKGROUND OF THE INVENTION

1. Technical Field

The present invention relates to an improved system and method for aligning a snack chip and, in particular, to a system and method that transports a snack chip while maintaining a substantially flat formation. The system allows snack chip preforms to be processed while maintaining a substantially flat shape for later processing to form a shaped snack chip

2. Description of Related Art

Snack chips and other food products are frequently made to assume a desired shape. Often, these shapes are merely ornamental in design to assume an interesting shape that appeals to consumers. Sometimes, snack product shapes assume a utilitarian function. One such function is to retain liquid mixtures such as dip, salsa, bean dip, cheese dip, and the like.

When a consumer chooses to eat a chip with dip, the consumer typically holds a single chip and immerses a portion of the chip into the dip. The consumer then transfers the dipped chip to his mouth for eating. Often though, the desired quantity of dip fails to adhere sufficiently to the chip or is lost during the transfer process. This problem is particularly noticeable when the chip is flat or relatively flat. Additionally, round or triangular flat chips are often too large to insert into a jar or fail to retain a sufficient quantity of dip on the chip surface during removal of the chip from the jar. With traditional chips, some are too large to consume in one bite. When this occurs, the dip on the uneaten portion of the chip frequently slides off creating a mess and a dissatisfied consumer.

To help retain dip, snack chips have been made with curved surfaces. Shaped snack chips allow the consumer to scoop up a desired portion of dip without losing a significant quantity during transfer to the mouth for eating. Further, shaped chips are more maneuverable for insertion into ajar or can of packaged dip such as salsa. The utilitarian shapes known include for example ridges, scoops, taco-shaped, spoon-shaped, and bowl-shaped. Of these, a bowl-shaped chip is particularly desirable as it has a retaining wall or edge surrounding the entirety of the chip.

The system and method for making a shaped chip, especially a bowl-shaped chip, is more complex as compared to traditional flat chip manufacturing processes. With traditional chip production, the dough or masa is extruded or sheeted into a desired chip shape. After extrusion, the chips are transported towards and through a toaster. For this, the chips are deposited onto a moving belt. After toasting, the shaped chips have increased stiffness for insertion into a fryer. To convey the chips into the fryer for dehydration, the chips are removed from the toasting belt or conveyor. To do this, a doctor blade is commonly used to lift the chips from the surface of the belt. Upon contact with the doctor blade, the chips are forcefully lifted from the belt and transported onward into the fryer. As such, the chips are often deformed from being relatively flat into a chip have wraps, curls, waves, and other structural deformities. Particularly to tortilla chips, this is not a substantial problem as tortilla chips are typically not molded. For a molded chip however, a uniform preform chip is needed.

An alternative method is shown in U.S. Pat. No. 6,129, 939 to Fink et al. for making a shaped snack chip. A form fryer produces a shaped snack chip by placing chips into a bowl-shaped mold cavity and frying the chip therein. Transport of the preform chips to a fryer is achieved with the use of an airslide. An airslide transports the preform chips via a cushion of air. Although a doctor blade is avoided, expensive equipment is needed to maintain the constant airflow. Further, the spatial orientation of the preform chips is not maintained to a high degree.

Consequently, a system and method for transferring preform snack chips that can operate efficiently, effectively, and inexpensively is desired. Such a system and method should be capable of transferring preform snack chips from a toaster on to additional processing while keeping the costs associated with the chip manufacturing and production within industry standards.

SUMMARY OF THE INVENTION

The present invention is an improved system and method for transferring preform snack chips from a toaster on to additional processing for producing a shaped snack product such as bowl-shaped tortilla chips. The invention utilizes a sheeter for forming a sheet of dough (masa) into pieces that is fed to a toaster via a conveyor. The essentially flat shaped pieces, which for example could be hexagonal shaped pieces are fed into one or more high temperature toasting ovens to add rigidity to the chips for the steps to follow. After toasting, the partially dried preform chip is conveyed to a piece alignment system.

For the transfer to the piece alignment system, toasted preform chips are transferred from a toaster belt to a transfer belt of the piece alignment system with the use of the improved system for transferring preform snack chips. This system involves using a toaster discharge roll that has a substantially reduced diameter of about 4 inches as compared to prior art rolls having about 16 to about 18 inch diameter. Adjacent to the discharge roll of the toaster belt, a pickup roll of the transfer belt of the piece alignment system has about a 0.75 inch diameter. Further aiding the transfer, the transfer belt is positioned slightly lower than the toaster belt, about 0.2 to about 0.5 inches. By using a smaller roll at the toaster discharge, the preform chips are transferred without the use of a doctor blade or other mechanical aid. By avoiding the use of a doctor blade, the registration or positioning of the preform chips is essentially maintained. Also, the disadvantages of using a doctor blade, which include mechanical wear, product jamming between the blade and belt, product deformation, and the like, are avoided. The transferred preform chips are then further aligned with a piece alignment system to ensure proper molding of the chips to form shaped snack chips.

Following the transfer from the toaster, the piece alignment system aligns the chips prior to a plunger and mold conveyor system, which provides shape to the chips. The piece alignment system comprises a series of belts whereby the ranks (rows) of chips can be adjusted for proper placement for the plunger and mold conveyor. After the product is plunged in the mold conveyor, the chips pass through at least one oven for reducing chip moisture and providing additional rigidity for frying. Thereafter, the chips are ejected from the molds and are inputted into a fryer where the chips attain their final packaging moisture. Following frying, the chips are passed through an optional salter where salt and/or flavoring is added. The chips are then passed along for packaging for consumers. With the system for transferring preform snack chips, preform snack chips can be transferred efficiently, effectively, and inexpensively. The above as well as additional features and advantages of the present invention will become apparent in the following written detailed description.

DETAILED DESCRIPTION

Figure 1:
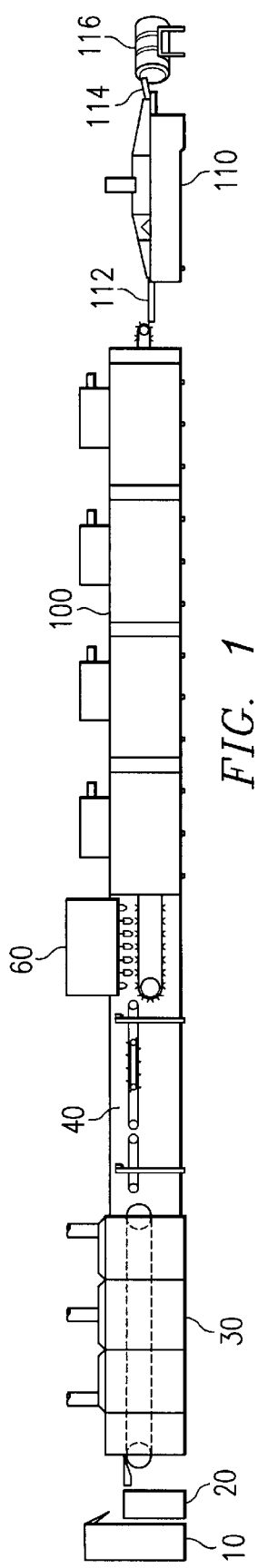
FIG. 1 is a schematic perspective view of a system for making shaped snack products.

In FIG. 1, a system and method for forming a shaped snack chip is shown. Sheeter 10 forms a sheet of dough that is fed to toaster 30 via conveyor 20. Conveyor 20 transfers the essentially flat shaped raw chips, which for example are hexagonal shaped chips. The flat shaped dough or chip is then fed into a high temperature toasting oven 30 for adding rigidity for the following steps. The partially dried chip is thereafter fed to a piece alignment system 40. The piece alignment system 40 aligns the product for feeding to a plunger and mold conveyor 60. Plunger and mold conveyor 60 imparts a shape to the chips. After the product is plunged to the mold shape, the chips pass through a multizone dryer 100 for reducing chip moisture. Thereafter, the chips are ejected from the molds and are fed into a fryer 110 where the chips attain their final packaging moisture. Following frying, the chips are passed through an optional salting drum 116 where salt and/or flavoring is added. Thereafter, chips 200 shown in FIG. 2, capable of retaining a liquid mixture are passed along for packaging for consumers.

In one embodiment, sheeter 10 has sheeter rollers and a conveyor 20 mounted in a common frame as a single unit (not shown). Sheeter 10 receives the dough at an inlet. The dough can be comprised of corn, wheat, rice, or other grains and mixtures thereof. For the preferred embodiment, the dough is comprised of white dent corn. As the sheet is formed in sheeter 10, a cutter within sheeter 10 having the initial chip shape, which for example is an essentially flat hexagon, is provided. As dough passes by a cutter within sheeter 10, the initial chip shape is formed so that essentially flat chips 202 being produced have approximately the same shape and thickness upon exiting sheeter 10. Chips 202 are conveyed over conveyor 20 towards toaster 30. Optionally, conveyor 20 has a pneumatic lift system to raise the conveyor to provide access to toaster 30 as needed. This is beneficial because as formed product exits sheeter 10 the product essentially drops a small distance onto conveyor 20. As the physical properties of the product being sheeted may change such as the coarseness and particle size of the dough, the adhesive properties, and the moisture content, the ability to adjust the need for adjusting this drop is beneficial to maintain product uniformity.

After the dough is sheeted into the chip product's initial shape, chips 202 are fed to toaster 30 for reducing the product moisture. The chip moisture leaving the sheeter is typically about 50 to about 52% and is reduced to about 30 to about 40% by toaster 30. Chips 202 are dropped onto a rotating transfer belt 32 for passage through toaster 30. Toaster 30 toasts chips 202 through heating with infrared (IR), radio frequency, convective, ribbon burners, direct gas fired, conductive, impingement, and microwave heating for example. In a preferred embodiment, a series of IR burners or direct flame belt heaters are used. After toasting, chips 202 are transported to piece alignment system 40.

Figure 3:
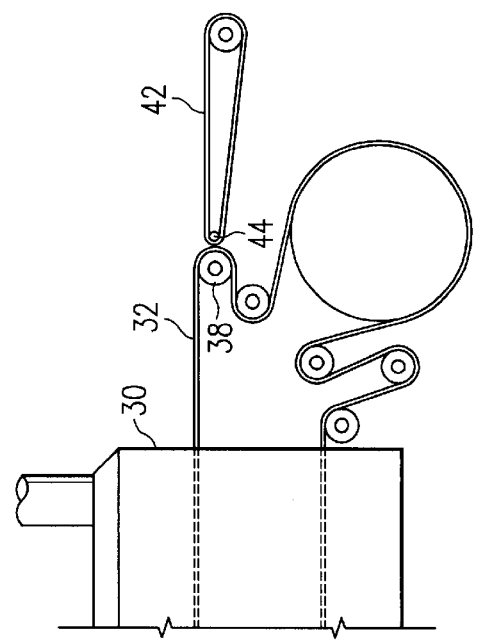
FIG. 3 is a schematic side elevation view of the toaster and piece alignment system portion of the system shown in FIG. 1.
Figure 4:
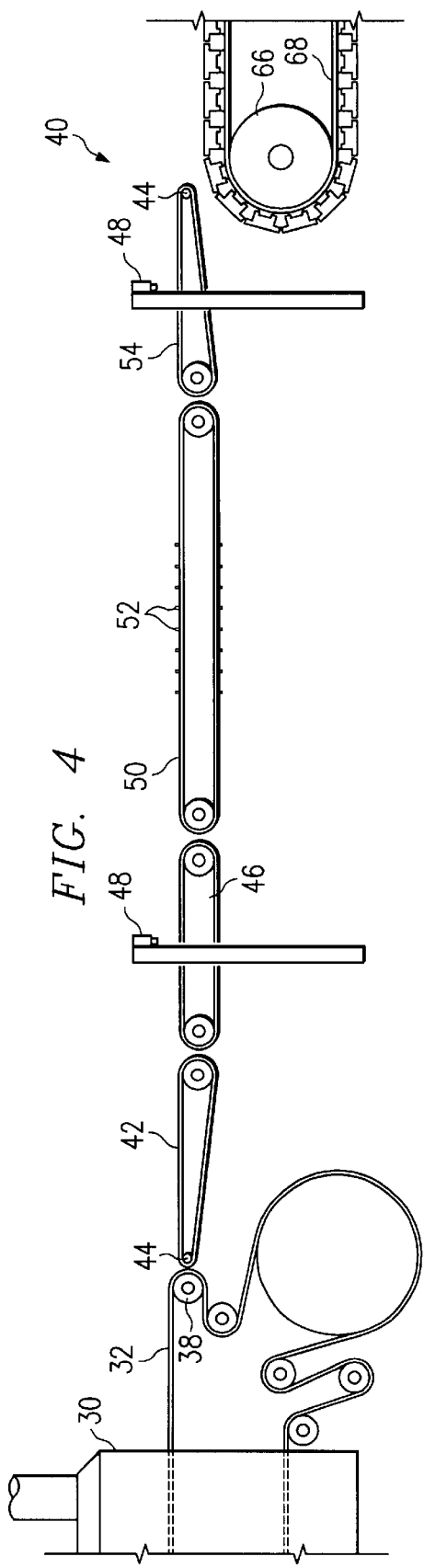
FIG. 4 is a schematic elevation view of the toaster, piece alignment system, and plunger and mold conveyor portion of the system shown in FIG. 1.

Preferably, the product coming forth from toaster 30 just prior to a piece alignment system 40 utilizes a bladeless monolayer transfer system as shown in FIGS. 3 and 4. Generally, an assist is needed to lift product from a toaster belt after passing because the product tends to become adhesive or sticky due to the physical nature involved in heating a moist and starchy mixture. Previously, doctor blades, air slides, or other mechanical devices were used to lift products such as chips from a belt. Blade assisted transfer though has an inherent tendency for the blade to fail due to sticky residue buildup thereon creating a jam or blockage, nicks in the blade from high force contact with the toaster oven belt, blade replacement, or the blade losing contact with the belt causing chips to be captured between the blade and toaster oven belt. Other means of transfer such as an air slide employ mechanical devices that add additional cost to production and do not readily maintain product registration or formation that is beneficial to a molding process.

With the bladeless transfer, the spatial alignment of a monolayer of product leaving toaster 30 is maintained more readily than with using a conventional blade assisted transfer. To achieve bladeless transfer, the terminal end of toaster oven belt 32 has a discharge roll 38 that is disposed higher, about 0.2 to about 0.5 inches higher, than a transfer conveyor or belt 42. The leading edges of the toasted chips 202 essentially lift off of toast oven belt 32 at discharge roll 38 and convey onto transfer belt 42 at a nosebar roll 44. This is enabled by discharge roll 38 being about 25% of the size of a prior art discharge roll. In a preferred embodiment, discharge roll 38 has a diameter of about 3 to about 6 inches, more preferable of about 4 inches. Further, transfer belt 42 is supported by at least one roll 44 which has a relatively small diameter, for example of about 0.75 inches. By having the diameters of the rolls supporting belts 32 and 42 closer together in size, the preform toasted chips 202 are able to maintain their structural integrity between the transfer from toaster oven belt 32 to transfer belt 42. To further aid the transfer of the snack chips, discharge roll 38 is positioned about 0.2 to about 0.5 inches higher than transfer belt 42 onto where the snack chips are deposited. Additionally, any debris such as extraneous dough will either pass between the narrow gap between belts 32 and 42 or simply continue along with the preform chips. This is unlike with a bladed transfer. Using the monolayer alignment transfer system eliminates the need for a blade or other mechanical transfer aid.

FIGS. 3 and 4 show transfer belt 42 which is the first of several conveyors or belts of the piece alignment system 40. The speed of transfer belt 42 operates at essentially the same rate as belt 32 to facilitate the bladeless transfer. With the product essentially aligned as a monolayer of partially dried chips 202, these chips 202 are transferred to a phasing conveyor or belt 46. Phasing belt 46 has an adjustable speed for transferring chips 202 from the speed on transfer belt 42 to the speed and position needed for mold alignment conveyor or belt 50. Once at proper speed, the product is fed to alignment belt 50.

Figure 5:
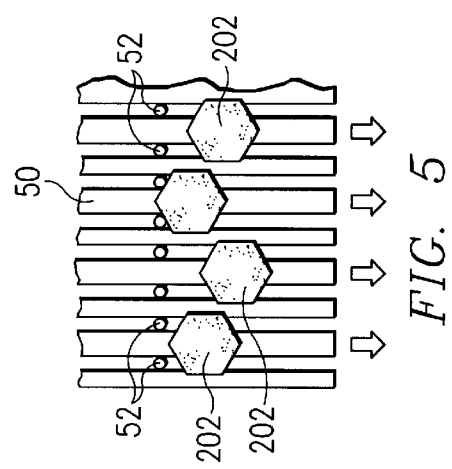
FIG. 5 is a schematic plan view of the alignment belt of the piece alignment system of the system shown in FIG. 1.

With alignment belt 50, the chips are aligned by rank (rows) and file (columns) for eventual feeding to a plunger and mold conveyor 60. Alignment belt 50 has a system for conveying the chips into essentially even ranks. Although the chips entering alignment belt 50 have essentially distinct and even files, the ranks are not sufficiently aligned for eventual feeding to the plunger and mold conveyor 60. Therefore in one embodiment, alignment belt 50 is outfitted with a series of cleats 52 that extend upwards from alignment belt 50 as shown in FIG. 5. These cleats 52 are moving slightly faster than alignment belt 50 and are traveling on a cleat conveyor 56 disposed beneath cleat conveyor (not shown) disposed beneath alignment belt 50.

As such, most chips are eventually pushed along the moving alignment belt 50 so that at the exiting from alignment belt 50 the chips have essentially even ranks. To maintain even files, it is preferable that at least two cleats 52 be provided per chip 202. Thereby, a trailing edge of chip 202 will end up disposed between at least two cleats 52. To catch each chip 202, the distance between two cleats 52 in a rank is smaller than the width of the chip. Upon exiting alignment belt 50, chips 202 are deposited on a discharge conveyor or belt 54 for transfer to mold belt 68 of plunger and mold conveyor 60.

To ensure that the majority of chips 202 passing onwards to the plunger and mold conveyor 60 are in proper alignment, a position control system is utilized with piece alignment system 40. Further the control system is used to insure that chips 202 are deposited onto alignment belt 50 such that chips 202 will be between rows of cleats 52. The control system compensates for the differences of the incoming speed of chips 202 being fed into the piece alignment system 40 and the positioning needed for the plunger and mold conveyor 60. If not positioned properly within a determined acceptable range for the plunger and mold conveyor 60, then a number of chips 202 will not be positioned properly into the molds of the plunger and mold conveyor 60.

Therefore, a chip sensor 48 is positioned to operate in conjunction with piece alignment system 40. In a preferred embodiment, chip sensor 48 is positioned above phasing belt 46 and/or discharge belt 54. However, chip sensor 48 can be positioned at a number of locations along the system for forming a shaped snack chip 202. An optical sensor such as a photocell array can detect chips 202 to effectively determine their relative position. Other sensors can be employed however such as laser, ultrasonic, cameras, and color contrast.

The control system uses the information gathered from chip sensor 48 to determine the average rank position of chips 202 as to whether chips 202 are approaching on target, too early, or too late. Based upon this average computed position, an adjustment to the overall system is made if needed to insure that piece alignment system 40 is delivering essentially uniform ranks of chips to plunger and mold conveyor 60. To adjust the positioning of the chips, the control system could optionally adjust one or more of the speeds of transfer belt 42, phasing belt 46, cleats 52, and/or discharge belt 54 for optimal chip delivery to plunger and mold conveyor 60. As to positioning of the sensor, chip sensor 48 could be situated above transfer belt 42, phasing belt 46, alignment belt 50 at the chip entry, and/or discharge belt 54.

Figure 6:
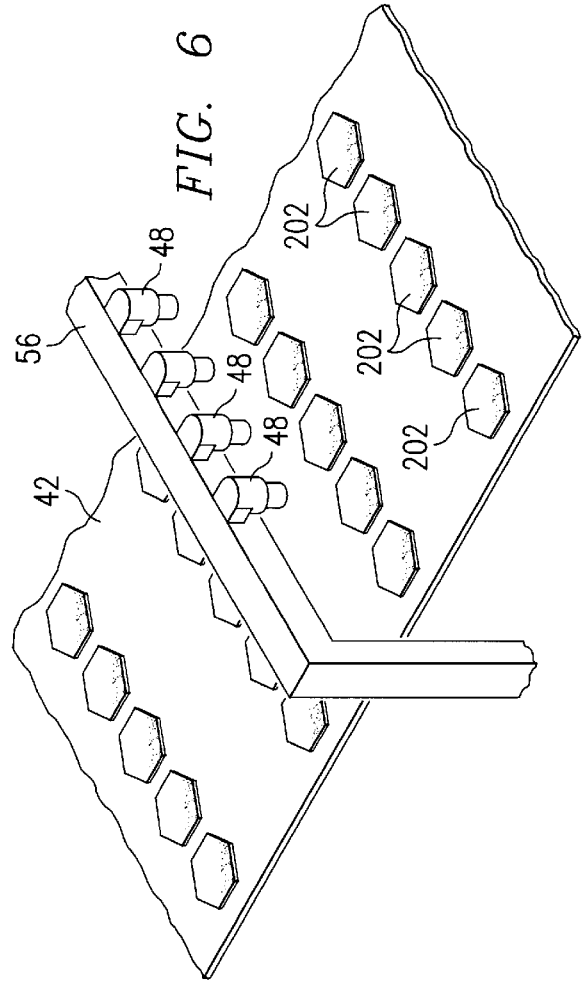
FIG. 6 is a schematic perspective view of a sensor array of the piece alignment system of the system shown in FIG. 1.

For example, a photocell array 56, utilizing chip sensors 48, is arranged to measure the front wall of the passing chips 202 as they pass on phasing belt 46 as shown in FIG. 6. The first and last files of these are typically not measured because these end chips 202 tend to accumulate scrap material from upstream processing. Sensing the remaining chips 202, the average position of chips 202 in that rank can be determined. The speed of phasing belt 46 is then adjusted if necessary to assure that the following ranks of chips 202 will be fed to plunger and mold conveyor 60 at the proper speed to assure maximum alignment of chips 202 being deposited onto molds 64.

Figure 7:
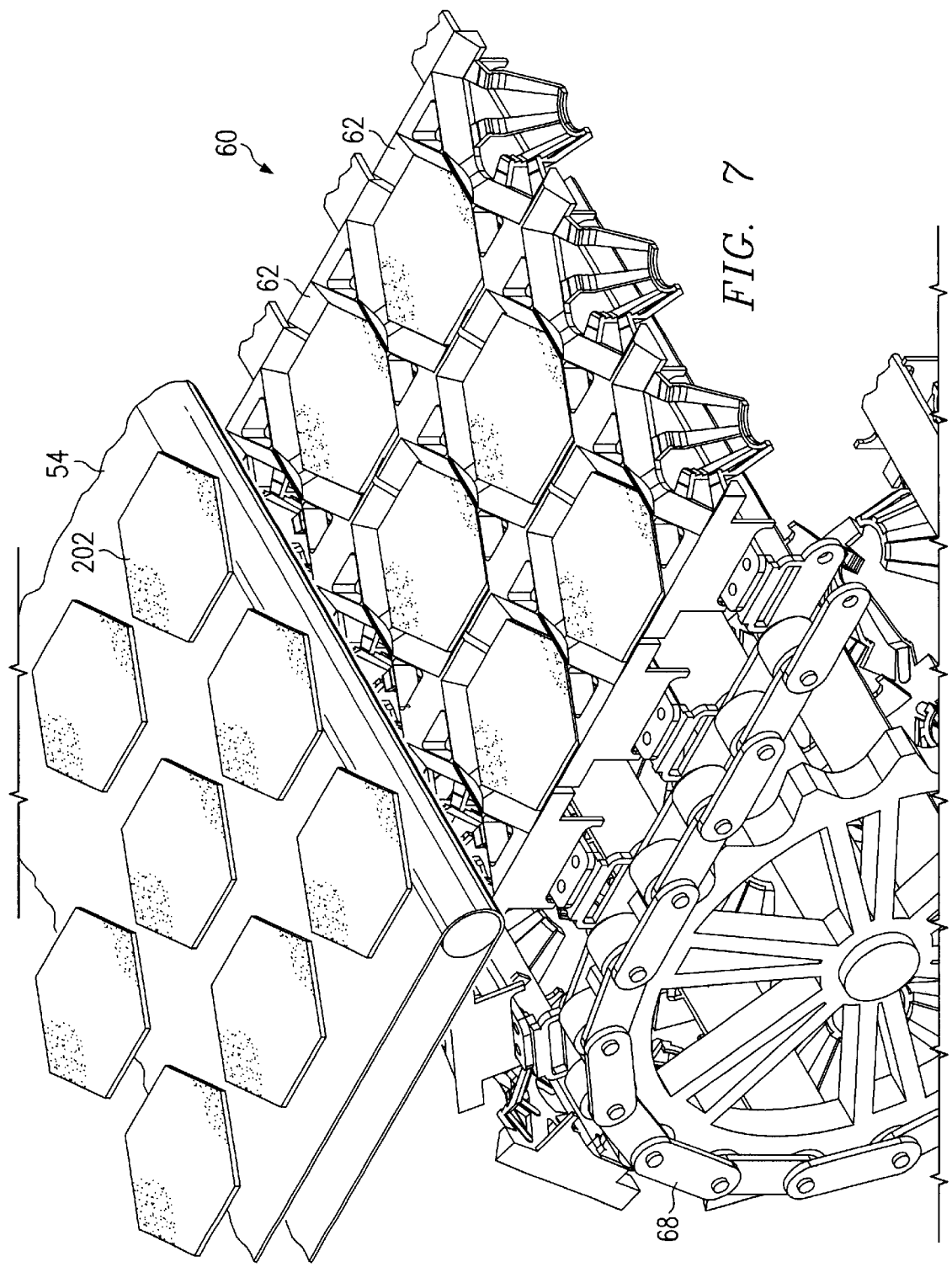
FIG. 7 is a schematic perspective view of the piece alignment system and plunger and mold conveyor portion of the system shown in FIG. 1.

FIG. 7 shows plunger and mold conveyor 60 receiving the flat chips 202. The moisture of chips 202 is at approximately the same moisture as upon their departure from toaster 30. At this moisture, the chips have enough cohesive integrity for molding.

Chips 202 are passed from discharge belt 54 to mold racks 62. Ranks of mold racks 62 are comprised of a series of connected individual chip molds 64 for imparting the desired shape to each chip 202. With proper sequencing, each mold 64 receives a chip properly aligned from piece alignment system 40. Although molds 64 can be of any practical shape for a snack chip, molds 64 preferably have a bowl-shape.

Figure 8:
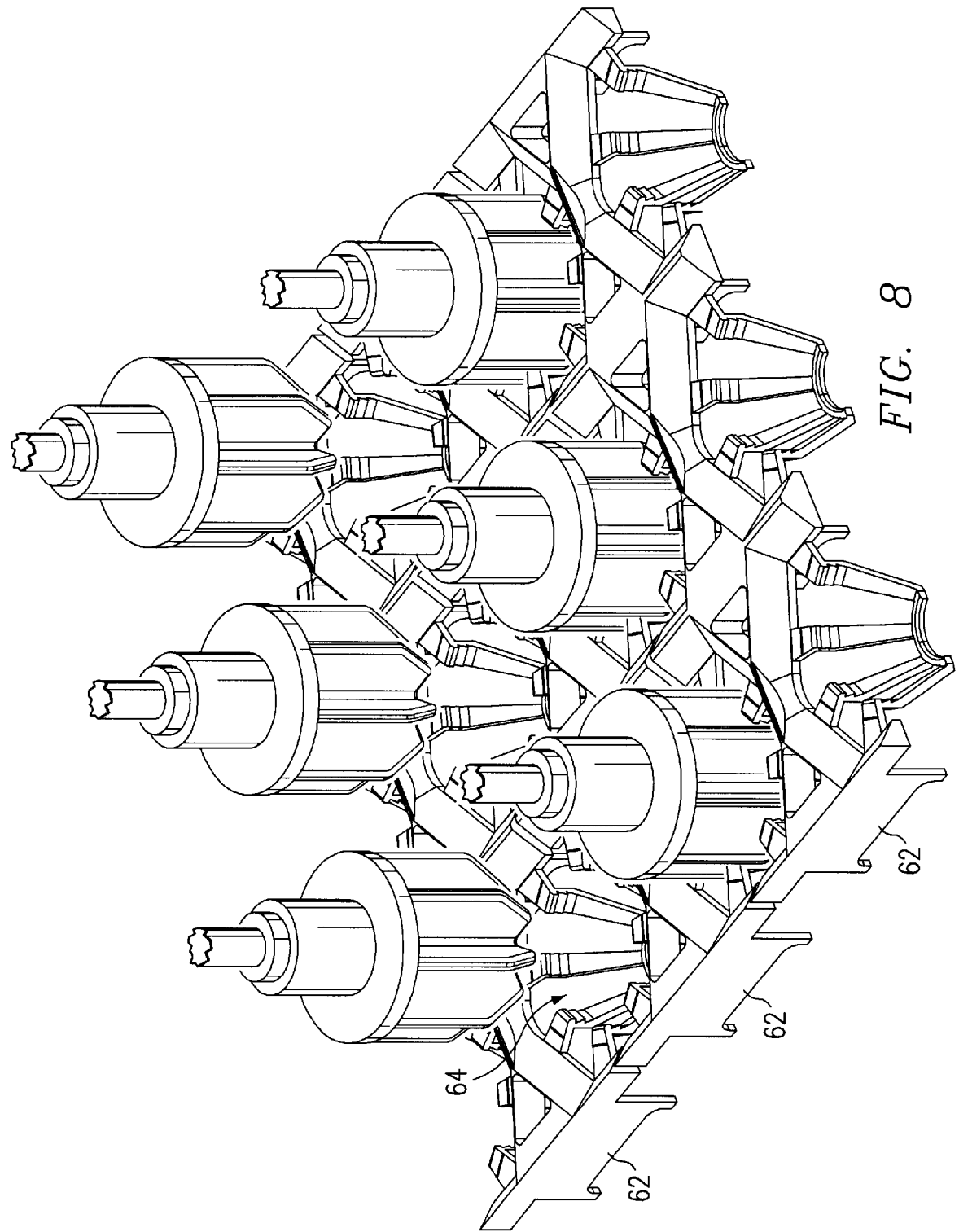
FIG. 8 is a schematic perspective view of the plunger and mold conveyor of the system shown in FIG. 1.
Figure 9:
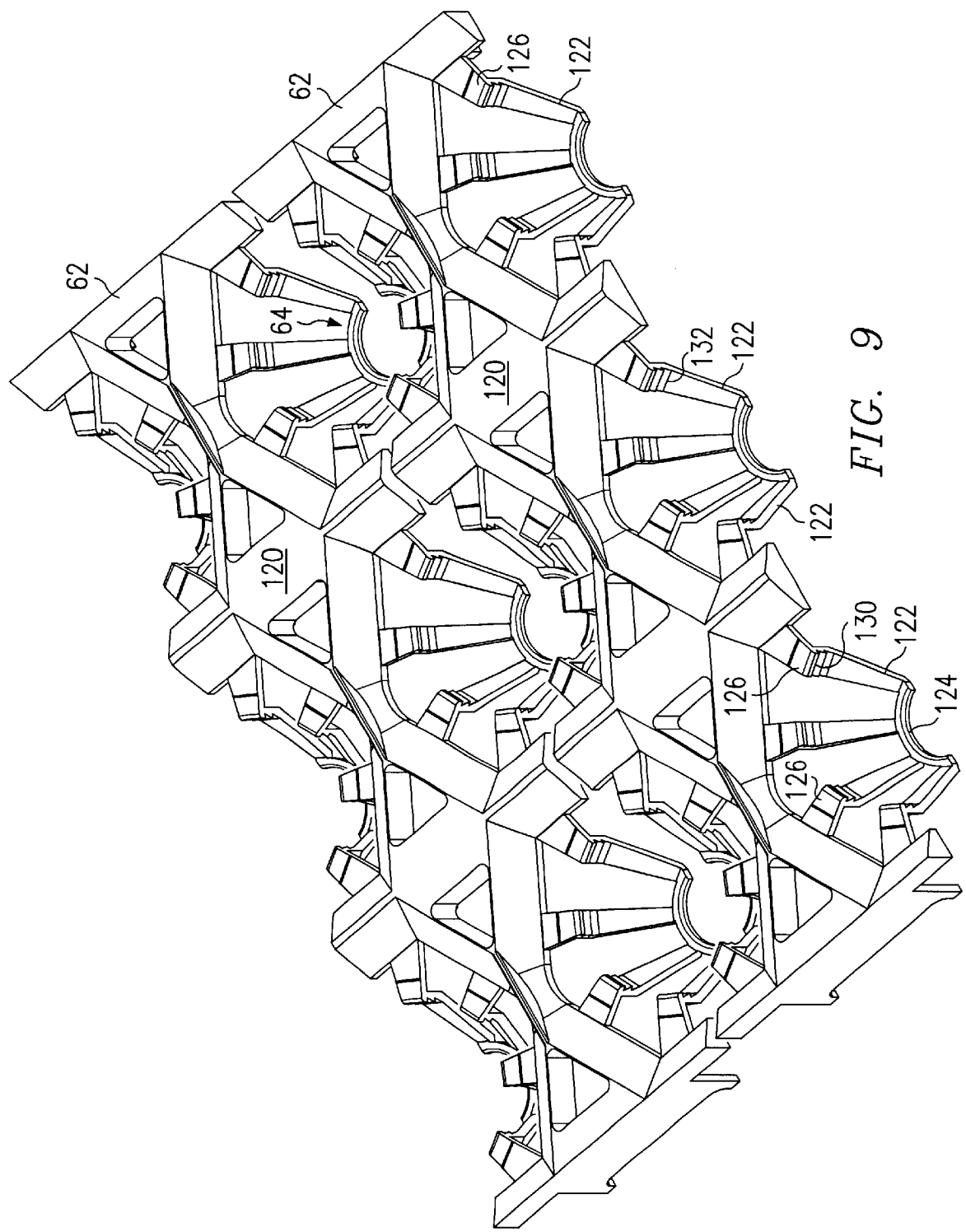
FIG. 9 is a schematic perspective view of mold racks in accordance with the invention.

FIGS. 8 and 9 show molds 64 that are formed by the juxtaposition of two racks of mold racks 62. Each mold rack 62 has a series of halves of molds 64 positioned along in ranks. Ranks of mold racks 62 travel continuously about mold belt 68. Mold belt 68 is timed to ensure that mold racks 62 are properly positioned for receiving the chips into molds 64 and for plunging. For example, a servo driver can properly control the timing of mold racks 62. In a preferred embodiment, mold belt 68 is a continuous chain belt disposed around rolls as shown in FIG. 7. As mold racks 62 begin to travel upwards around roll 66, the top portions of mold racks 62 begin to separate apart due to the physics of having rectangular-like mold racks 62 traveling about a roll. As mold racks 62 reach the top of mold belt 68, the top portions of mold racks 62 close together thereby forming molds 64. Similarly, after passing through dryers 100, molds 64 separate and open for discharging the chips.

As shown in FIG. 8, molds 64 have a bowl-shape. Other shapes are possible however such taco, oval taco, hexagonal taco, round saucer, canoe, spoon, oval, round, and more. Molds 64 are preferably only semi-enclosed in order to maximize the exposed surface area of the chip as it is further dried in dryers 100. Mold racks 62 contain a number of halves of molds 64 such that the juxtaposition of two mold racks 62 on mold belt 68 forms full molds 64. In the embodiment shown, six halves are disposed within a single mold rack 62 in a rectangular three by two scheme although other schemes are possible. Each half of mold 64 has its closed end towards the middle of mold rack 62. Linking the mold halves together on mold rack 62 is a mold rack support structure 120. As depicted in a preferred embodiment, mold rack support structure 120 is a solid mesh structure. This allows now molded chips 200 disposed in mold racks 62 to be exposed to a greater amount of air and heat in dryers 100 as compared to a solid mold rack. Also, less material is required to form mold rack 62 which reduces costs and weight. Typically, mold racks 62 can be formed from any moldable, heat resistant material such as plastic and metal. In the preferred embodiment, mold racks 62 and, therefore, molds 64 are made from stainless steel.

Figure 2:
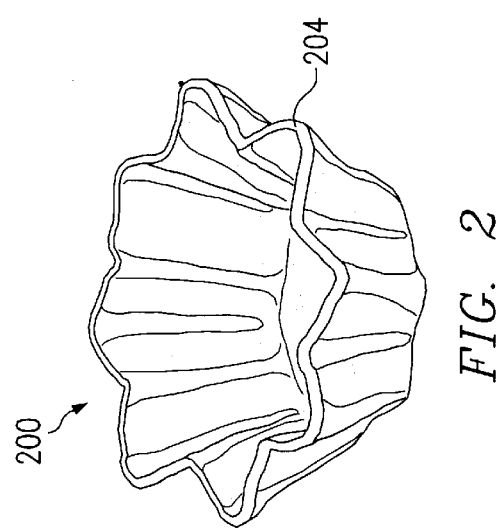
FIG. 2 is a side elevation view of a shaped snack chip produced in accordance with the invention.

FIG. 9 shows a cross section view of a preferred embodiment of mold 64. Mold rack support structure 120 confines each mold 64. Within mold 64, depending support arms 122 extend from support structure 120 downward and inward towards the center of mold 64 to affix to a bottom edge support 124. Bottom edge support 124 forms a partially open ring to support the shaped snack chip 200. At a top portion of depending support arm 122, a plateau edge 126 provides a resting surface for flat chips 202 yet to be plunged. When flat chip 202 is initially deposited into mold 64, plateau edges 126 support chip 202 over the open space of mold 64. To help retain chip 202 within mold 62, one or more barbs or beveled edges can be provided. As shown, optional upper and lower barbs 130 and 132 are disposed towards the top portion of the each depending support arm 122. Once the chip 202 is pressed into mold 64, the top edge will likely abut barbs 130 or 132 on several of depending support arms 122. As chip 202 is stamped into a mold 64, it assumes the mold's shape to form chip 200, which is a bowl-shape as shown in FIG. 2. Additionally, the chips can be given additional features of shape by modifying the shape of plunger inserts 80. Should a chip 202 be misaligned and not completely inserted into mold 64 by a plunger insert 80, the resulting chip produced will still generally have a scoop or bowl shape, although possibly not centered. This is because a portion of chip 202 will still be contacted by plunger insert 80. The portion of chip 202 contacted is forced into mold 64 which thereby produces a shaped chip 200.

To reduce the loss of chips not deposited into a mold 64, an optional feature of retaining chips can be provided. Fingers (not shown) can be provided to prevent a vertically oriented chip 202 from falling through the space between two mold racks 62 should a chip 202 not land into a mold 64. These fingers are attached to the base portion of mold rack 62 around bottom edge support 124 to extend between mold racks 62. Thereby, the fingers will support any vertical chips 202 as it travels along plunger and mold conveyor 60 and dryer 100. While these chips will not be plunged, they are retained to increase the product yield.

Figure 10:
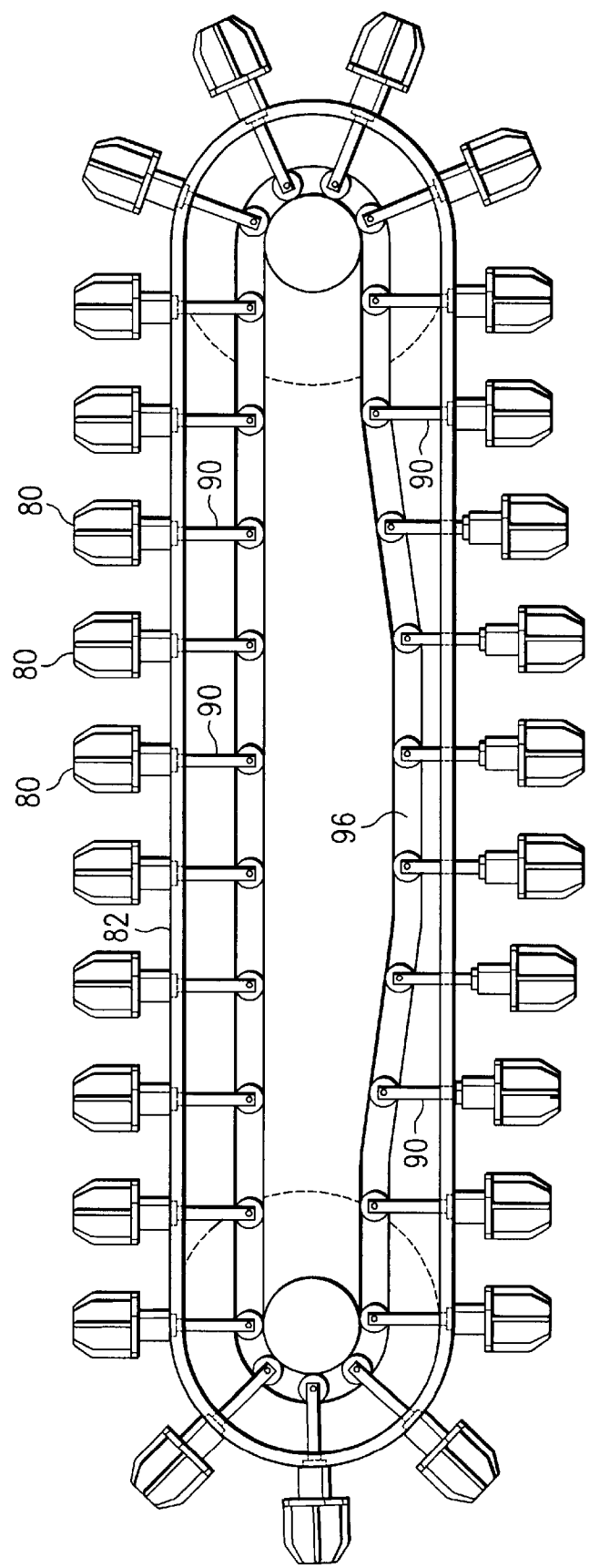
FIG. 10 is a schematic elevation view of a plunger belt in accordance with the present invention.

FIG. 10 shows plunger inserts 80 disposed along plunger belt 82 of plunger mold conveyor 60. Plunger inserts 80 are typically comprised of a moldable material such as silicone, rubber, plastic, or metal. Softer materials such as silicone, rubber, or plastic are preferred. Insuring that plunger inserts 80 will be aligned above the corresponding opening of mold 64, mold racks 62 and plungers 80 are carried longitudinally along on mold rack conveyor or belt 68 and plunger conveyor or belt 82, respectively, and are synchronized to operate together. Once chip 202 is disposed properly on mold 64 at plateau edges 126, a plunger insert 80 extends downward pushing chip 202 into mold 64. In operation, an individual plunger insert 80 extends into mold 64 for less than one second, generally only about 0.4 seconds. By minimizing the time that plunger insert 80 extends into mold 64 reduces the likelihood of product shearing effects caused from mechanical wear and thermal expansion. Further, minimizing the time reduces the amount of misalignment between plunger insert 80 and mold 64.

Figure 12:
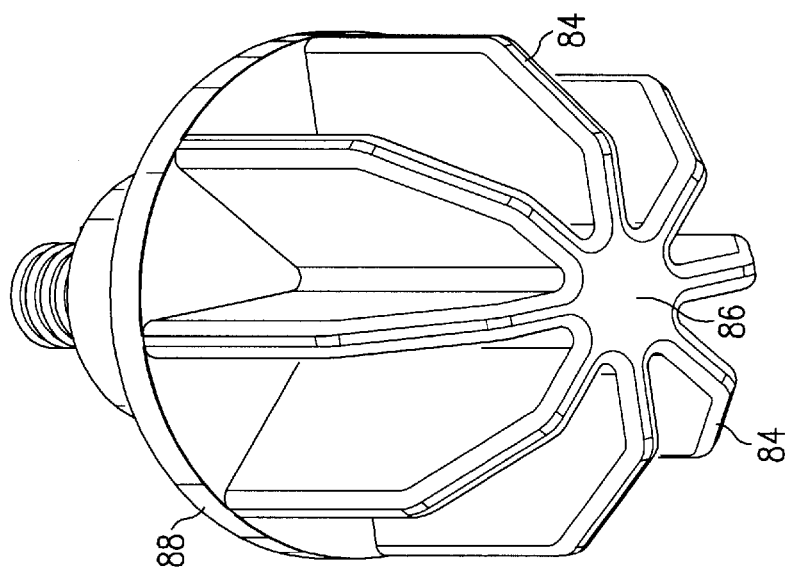
FIG. 12 is a schematic perspective bottom view of a plunger in accordance with the present invention.
Figure 11:
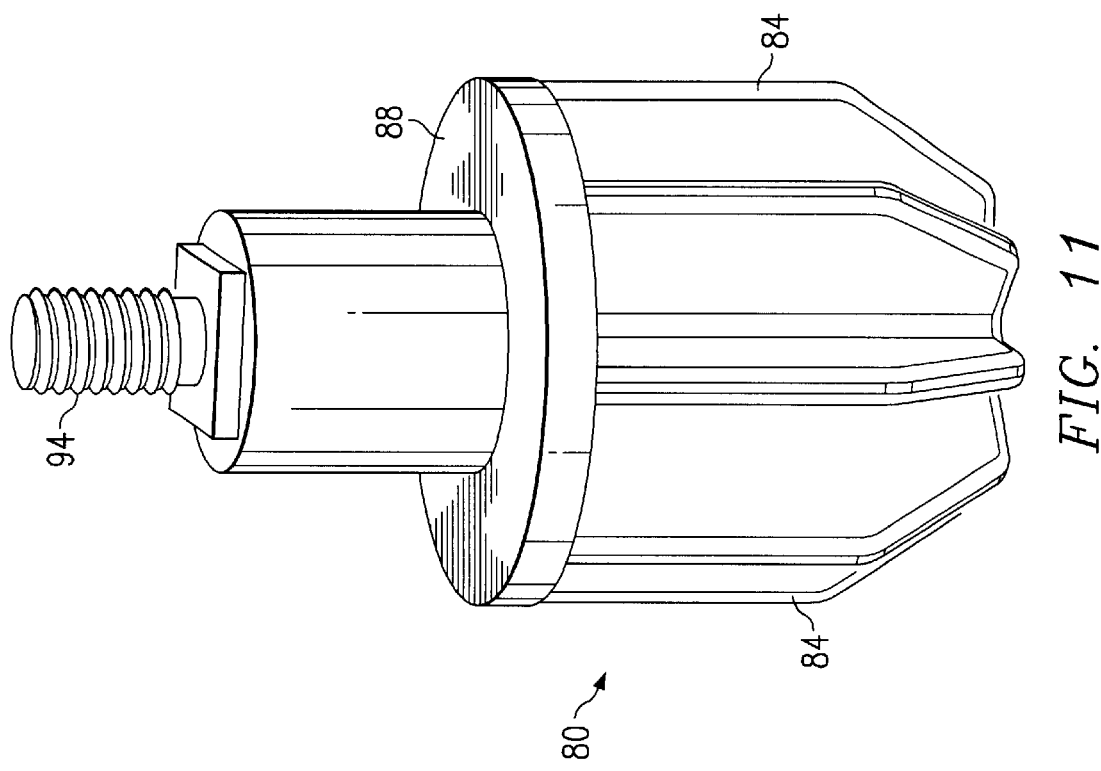
FIG. 11 is a schematic perspective side view of a plunger in accordance with the present invention.

FIG. 11 shows plunger insert 80 has eight fluted edges 84 extending outward from the plunger insert's central support rod 86. Fluted edges 84 provides ridges to the chip. With eight fluted edges, molded chip 200 will comprise an essentially octagonal shape after being plunged. In other words, each chip will have eight fluted edges. While plunger insert 80 is shown having eight fluted edges, other quantities of fluted edges are possible depending on the shape of the chip desired. The fluted edges 84 extend from a bottom portion of plunger insert 80 upward towards flange 88 shown clearly in FIG. 12. Flange 88 is disc shaped and is essentially parallel to plunger belt 82 in operation. The diameter of flange 88 is approximately equal to the inner width of mold 64. Further, flange 88 extend outward from support rod 86 to approximate the inner width of mold 64. As shown, fluted edges 84 extend from flange 88 downward towards the bottom of support rod 86. The bottom periphery of flange, shown in FIG. 12, approximates that of mold 64 while a top portion does not and extends linearly to provide fluted edges 204 to formed chips 200. Fluted edges 204 allow for a point of entry and easier dipping of the finished chip. Above flange 88, support rod 86 protrudes upward with plunger mating adapter 94. Plunger mating adapter 94 provides for the connection of plunger insert 80 to plunger belt 82. In one embodiment, plunger mating adapter 94 is a screw bolt which is received by a plunger platform 90 that is affixed to plunger belt 82.

Plunger belt 82 rotates above and at the same speed as mold belt 68 for suitable plunging and molding of shaped snack chips 200. As plunger inserts 80 rotate around on plunger belt 82, plunger inserts 80 are pressed into molds 64 at desired intervals. For appropriate timing, plunger belt 82 preferably uses a link conveyor arrangement. However, other arrangements are possible such as a walking beam or air piston plungers. With the conveyor arrangement, the plunger belt 82 is driven by a mechanical linkage powered by a support chain connected to mold belt 68. As a set of plungers 80 rotates towards the desired interval of plunging, a cam mechanism is depressed causing one or more sets of plungers into corresponding molds 64 in a vertical motion. To actuate the cam mechanism, a plunger actuator assembly 96 is provided. After a brief interval, the tension on the cams is released which thereby releases plungers 80 upward and out of molds 64. In application, two rows of plungers are retained per plunger platform 90. By having two or more rows per plunger platform 90, the number of mechanical components is reduced and the structural integrity is improved.

Once plunging is complete and chips 200 are passed through plunger and mold conveyor 60, chips 200 are conducted through a form dryer 100 while still retained within molds. Form dryer 100 is optionally a multizone dryer with four zones that reduces chips 200 down to a desired moisture content so that chips 200 will retain their shape after being ejected from molds 64 into fryer 110. In a preferred embodiment, the moisture of chips 200 after passing through form dryer 100 will be reduced to between about 23 to about 28%. Dryer 100 are hot air impingement ovens that utilize hot forced air. Other forms of drying however may be used such as infrared, microwave, or radio frequency. Optionally, a vacuum is provided from beneath mold belt 68 within form dryers 100 to aid in drying the chips. With the open structure of mold racks 62, a relatively large surface area of chips 200 will be exposed to the drying currents. In the preferred embodiment, drying is provided at a temperature of about 300 to about 400° F. The chips are reduced from an inlet moisture of about 34 to about 38% to an outlet moisture of about 23 to about 28%. At the end of the form dryers 100, chips 200 are separated from molds 64 onto a fryer feed conveyor or belt 112.

To release chips 200, molds 64 open and separate to allow the chips to continue towards fryer 110. To assist the release of chips 200, an air blower beneath mold rack belt 68 can direct a stream of air or other inert fluid towards the bottoms of molds 64. Since molds 64 are designed to be partially permeable, the air current will push chip 200 from the mold in addition to gravity. The shaped chips 200 are directed onto a fryer feed belt 112 and then into a fryer 110 containing oil.

Fryer 110 is used to bring the product to its final dryness for consumer packaging and to add flavor. The chip moisture upon entering fryer 110 is about 20 to about 24%. After frying, chip 200 has a moisture content of about 0.8 to about 1.3%, more preferably about 1.1%. Also, the oil content of chip 200 is about 23 to about 25%, more preferably about 24%. The process of frying chips 200 involves feeding chips 202 from belt 112 into fryer 110. Chips 200 are fed into fryer 110 in a random packing order whereby free-frying occurs. After free-frying, chips 200 are introduced into a paddle section for transferring to a submerger for deeper packing of chips. For evacuating chips 200 from the submerger section, multiple cascading conveyors hoist chip 200 out of the oil. Thereby, chips 200 drain any residual oil from any crevices in chips 200 as they are passed from one conveyor to the next. Chips 200 are then placed onto a fryer discharge conveyor or belt 114 for feeding to an optional drum 116 or to packaging. Rotating drum 116 provides any salting and/or flavoring that is desired. Thereafter, shaped chips 200 are sent to product packaging.

The present system and method produces a shaped snack chip more, preform snack chips can be transferred efficiently, effectively, and inexpensively. The present invention is superior to prior art systems and methods of making a shaped snack chip because preform chips are transferred without the use of mechanical assistance such as a doctor blade or air slide. Thereby, the system and method described in detail above facilitates the transfer of essentially flat chip preforms while maintaining the preforms' alignment for processing.

While the invention has been particularly shown and described with reference to a preferred embodiment, it will be understood by those skilled in the art that changes in form and detail may be made therein without departing from the spirit and scope of the invention.

What is claimed is:

1. A system for transferring snack products in a monolayer alignment, comprising:

a first conveyor supported by at least one roll having a first diameter of about 3.0 inches to about 6.0 inches; and a second conveyor supported by at least one roll having a second diameter of about 0.75 inches; wherein the first conveyor comprises an oven belt, and wherein further the first conveyor's roll having the first diameter is positioned in close proximity to the second conveyor's roll having the second diameter, allowing the snack products to transfer from the first conveyor directly to the second conveyor.

2. The system of claim 1 wherein the first conveyor passes through a toaster having an entrance and an exit.

3. The system of claim 2 further comprising a piece alignment system comprising:

the second conveyor for transferring the snack products from the toaster;

a phasing conveyor for adjusting the velocity of the snack products;

an alignment belt having a means for positioning the snack products into essentially even ranks; and a discharge conveyor for adjusting the velocity of the snack chips received from the alignment belt and for feeding the snack chips to a mold conveyor.

4. The system of claim 1 wherein the first conveyor's roll having the first diameter is sufficiently small enough and is positioned close enough to the second conveyor's roll having the second diameter to enable the snack products to transfer from the first conveyor directly to the second conveyor without the assistance of a blade or other mechanical transfer aid.

5. The system of claim 1 wherein the first diameter is about 4.0 inches.

6. The system of claim 1 wherein the second conveyor is positioned about 0.2 to about 0.5 inches lower than the first conveyor.

7. The system of claim 1 wherein the snack products are preform snack chips comprised of masa.

8. A method for transferring snack products in a monolayer alignment, comprising:

conveying the snack products on a first conveyor supported by at least one roll having a first diameter of about 3.0 inches to about 6.0 inches;

providing a second conveyor supported by at least one roll having a second diameter of about 0.75 inches; and transferring the snack products from the first conveyor directly to the second conveyor wherein the first conveyor comprises an oven belt, and wherein further the first conveyor's roll having the first diameter is positioned in close proximity to the second conveyor's roll having the second diameter.

9. The method of claim 8 wherein the first conveyor conveys the snack products through a toaster to increase rigidity of the snack products for additional processing.

10. The method of claim 8 wherein the step of transferring the snack products comprises operating the first conveyor at a velocity sufficient to enable the snack products to lift off of the first conveyor at the roll having the first diameter and transfer directly onto the second conveyor.

11. The method of claim 8 wherein the first diameter is about 4.0 inches and the second diameter is about 0.75 inches.

12. The method of claim 8 wherein the second conveyor is positioned about 0.2 to about 0.5 inches lower than the first conveyor.

13. The method of claim 8 wherein the snack products are preform snack chips comprised of masa.

14. The method of claim 8 wherein the transferring snack products essentially maintains the snack products' spatial orientation from the first conveyor to the second conveyor.

* * * * *